United States Patent [19]

Koto

[11] Patent Number: 4,525,728
[45] Date of Patent: Jun. 25, 1985

[54] INK JET RECORDING HEAD

[75] Inventor: Haruhiko Koto, Shiojiri, Japan

[73] Assignees: Epson Corporation; Kabushiki Kaisha Suwa Seikosha, both of Tokyo, Japan

[21] Appl. No.: 488,580

[22] Filed: Apr. 25, 1983

[30] Foreign Application Priority Data

Apr. 27, 1982 [JP] Japan .................................. 57-70958

[51] Int. Cl.³ ............................................ G01D 15/18
[52] U.S. Cl. ................................................ 346/140 R
[58] Field of Search ......................................... 346/140

[56] References Cited

U.S. PATENT DOCUMENTS

| | | | |
|---|---|---|---|
| 4,115,789 | 9/1978 | Fischbeck | 346/140 |
| 4,189,734 | 2/1980 | Kyser | 346/140 X |
| 4,350,989 | 9/1982 | Sagae | 346/140 |
| 4,364,067 | 12/1982 | Koto | 346/140 |
| 4,367,480 | 1/1983 | Kotoh | 346/140 |
| 4,443,807 | 4/1984 | Koto | 346/140 |

OTHER PUBLICATIONS

Kyser et al., Design of an Impulse Ink Jet, Journal of Applied Photographic Engineering, vol. 7, No. 3, Jun. 1981, pp. 73-79.

Primary Examiner—Joseph W. Hartary
Attorney, Agent, or Firm—Blum Kaplan Friedman Silberman & Beran

[57] ABSTRACT

An on-demand type ink jet recording head. The ink jet recording head includes a substrate having a plurality of pressurization chambers of substantially rectangular configuration disposed thereon. Ink supply passages and nozzles are provided for each pressurization chamber. Each pressurization chamber also has a vibratory plate and a piezoelectric element which cooperate to change the volume of the pressurization chamber to cause ink to be ejected out of the respective nozzles thereof. Each nozzle has an equivalent nozzle length of 1 mm or less. Each pressurization chamber has a width of 1 mm or less and a length of 1 mm or more. The vibratory plate has a thickness of 200 μm or less and the piezoelectric elements have a thickness of 200 μm or less.

8 Claims, 16 Drawing Figures

FIG. 12A
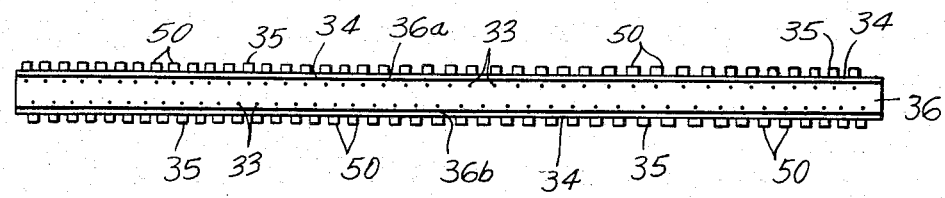
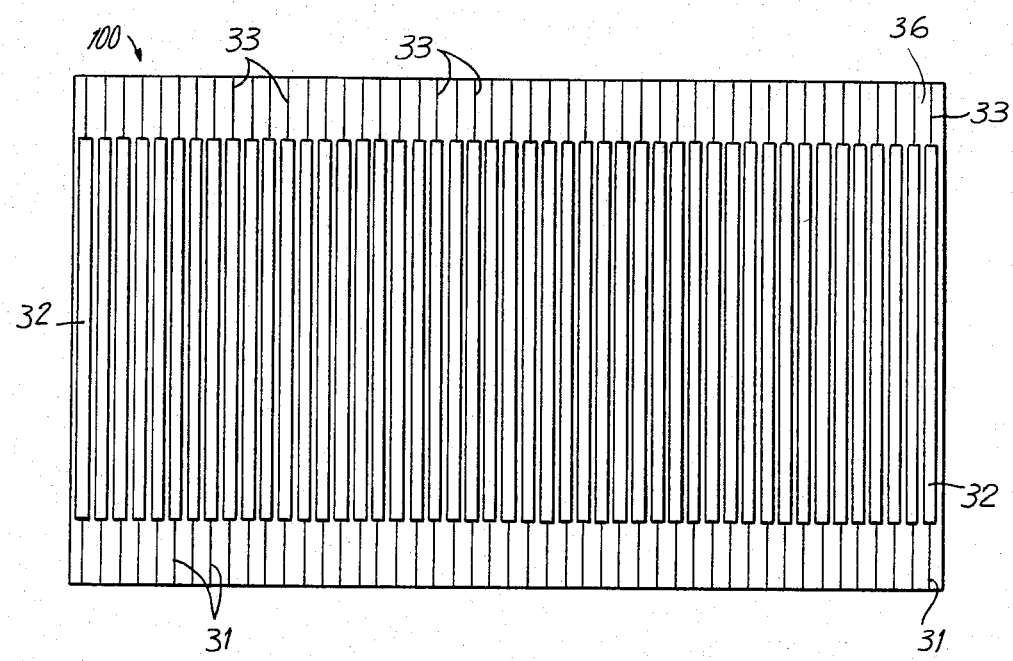
FIG. 12B

INK JET RECORDING HEAD

BACKGROUND OF THE INVENTION

The present invention is directed to an ink jet recording head and, in particular, to an on-demand type ink jet recording head in which the dimensions of the components thereof are selected to permit high integration of the components so that the ink jet nozzles may be substantially more closely spaced than had been available in prior art constructions.

It is known to provide an on-demand type ink jet recording head having multiple nozzles which provides a plurality of on-demand type ink jets arranged on a head substrate for ejecting ink particles or droplets through the nozzles under ink pressure converted from electric signals by the action of an electro mechanical transducer such as a piezoelectric element which actuates a vibratory plate. Such prior art constructions are shown in U.S. Pat. Nos. 4,199,769 and 4,216,483. The ink jet assembly of U.S. Pat. No. 4,216,483, for example, requires that the nozzles thereof be angled to permit close spacing of the nozzle openings at the end of the ink jet recording head. Such a construction as well as that shown in U.S. Pat. No. 4,119,769 do not permit high integration of the ink jet head components.

In such prior art constructions, when an increase in the degree of nozzle integration is desired, the length of each nozzle must increase. However, when the nozzle length is increased, various operating characteristics of each nozzle must be increased. Thus, these prior art limitations prevent the design of an ink jet recording head having highly integrated multiple nozzles. Accordingly, it is desired to provide an ink jet recording head in which high nozzle integration may be provided. Through experimentation and theoretical calculation, the present invention provides such a highly integrated nozzle configuration for on-demand type ink jet recording heads.

SUMMARY OF THE INVENTION

Generally speaking, in accordance with the present invention, an on-demand type ink jet recording head is provided. The ink jet recording head includes a substrate and a plurality of pressurization chambers of substantially rectangular configuration disposed in adjacent relationship on the substrate. Each pressurization chamber has an inlet and an outlet with an ink supply passage in fluid communication with each respective inlet thereof for supplying ink to the pressurization chambers. Each pressurization chamber also has a nozzle with a first end in fluid communication with respect to outlet thereof and a second end through which ink droplets are ejected. The pressurization chambers have a vibratory plate which forms at least a portion of a wall of the pressurization chambers and a piezoelectric element associated with each pressurization chamber and coupled respectively to the vibratory plate thereof. The piezoelectric elements are responsive to an electric signal selectively applied thereto for flexing the vibratory plates associated therewith to change the volume of the pressurization chambers associated therewith. The nozzles each have an equivalent nozzle length Ln of 1 mm or less defined between the outlet of the pressurization chamber and the second end of the nozzle. Each pressurization chamber has a width Wc of 1 mm less than and a length Lc of 1 mm or more. The vibratory plate has a thickness Tv of 200 $\mu$m or less and the piezoelectric elements have a thickness Tp of 200 $\mu$m or less.

Such a construction permits high nozzle integration in an ink jet recording head.

Accordingly, it is an object of the present invention to provide an improved on-demand type ink jet recording head.

Another object of the present invention is to provide an improved on-demand type ink jet recording head having highly integrated multiple nozzles.

A further object of the present invention is to provide an on-demand type ink jet recording head with multiple nozzles which has on-demand ink jets with ink pressurization chambers each having a width of 1 mm or less with the nozzles being spaced at an inter nozzle pitch of 1/60 inch or less.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 12A is a front elevational view of an ink jet recording head having highly integrated nozzles constructed in accordance with the present invention; and FIG. 12B is a top plan view of the ink jet recording head depicted in FIG. 12A.

DESCRIPTION OF THE PREFERRED EMBODIMENTS

Figure 1A:
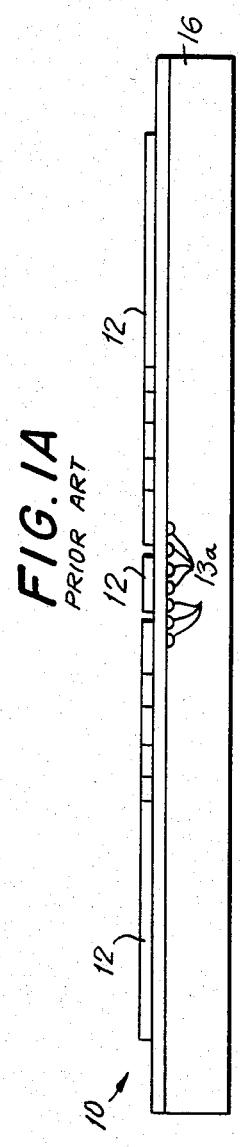
FIG. 1A is a front elevational view of an ink jet recording head constructed in accordance with the prior art.
Figure 1B:
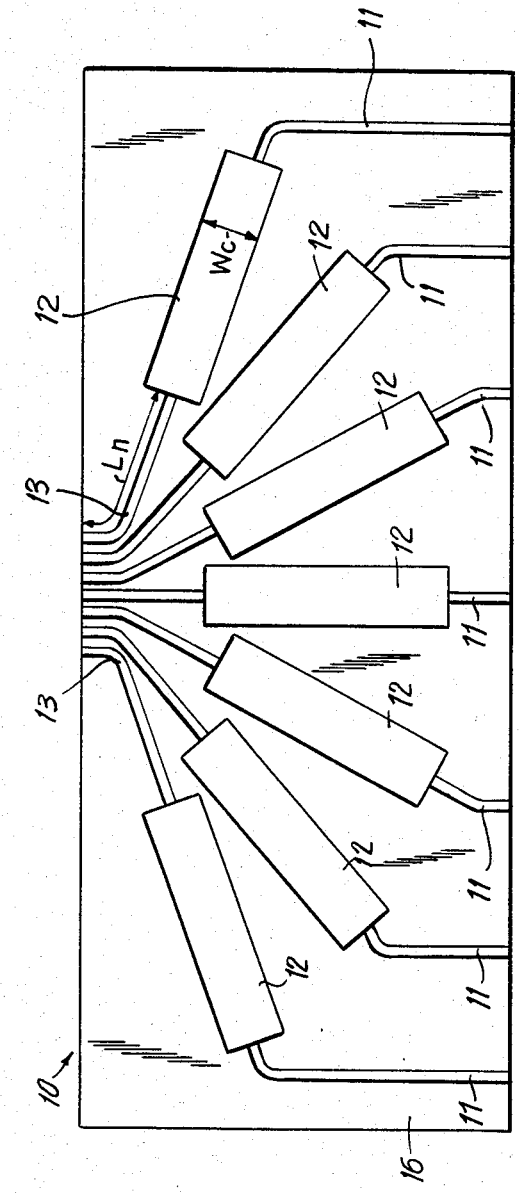
FIG. 1B is a top plan view of the ink jet recording head depicted in FIG. 1A.

Reference is first made to FIGS. 1A and 1B which depict an on-demand type ink jet recording head, generally indicated at 10, with multiple nozzles constructed in accordance with the prior art. Ink jet recording head 10 includes ink supply passages 11, ink pressurization chambers 12 which receive ink from ink supply passages 11, nozzles 13 having outlet orifices 13a which receive ink from pressurization chambers 12 and a head substrate 16 which supports these elements. The on-demand type ink jets are composed of a composite system of electrical, mechanical, and fluidic elements. Transducers such as piezoelectric elements coupled to the pressurization chambers are selectively activated to change the volume of the pressurization chambers to effect ink ejection through the nozzles.

It is known that the voltage required for driving the recording head can be increased by reducing the width Wc of each ink pressurization chamber 12. Heretofore, piezoelectric devices have suffered from dielectric breakdown when the ink pressurization chamber is designed to have its width Wc selected on the order of 1 mm. A dot pitch of 1/60 inch (0.423 mm) has been required to achieve a desired recording density. In order for the prior art recording head to meet such a dot pitch, it has been necessary that the nozzles be bent and positioned as shown in FIG. 1B.

The recording head thus constructed is however disadvantageous in that the ink jets have had irregular characteristics. Furthermore, the same recording head becomes larger in size as the degree of integration of the nozzles is increased since the width Wc of ink pressurization chamber 12 is large.

With the recording head of the foregoing construction, an increase in the degree of nozzle integration results in the need for a larger length Ln of each nozzle. The greater the length Ln, however, the greater the inertance Mn and resistance Rn of the nozzle. Since no ink droplets can be ejected when the length Ln exceeds a given value, the recording head has a serious disadvantage in that there are limitations on the manner in which a multiple nozzle construction can be designed.

Figure 2A:
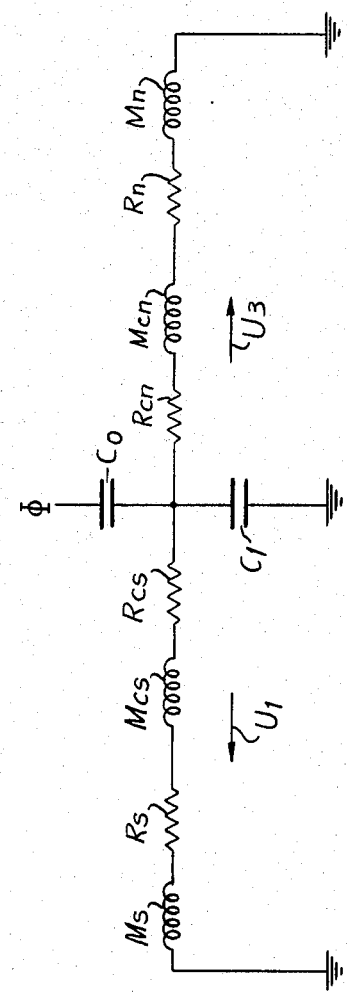
FIGS. 2A through 2C are diagramtic views for explaining various dimensions and parameters for use in describing the ink jet recording head of the present invention.
Figure 2C:
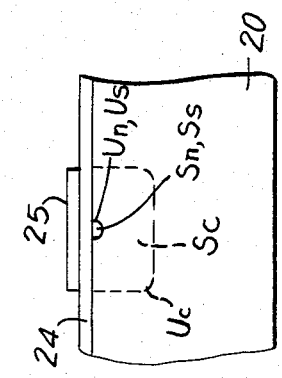
Figure 2B:
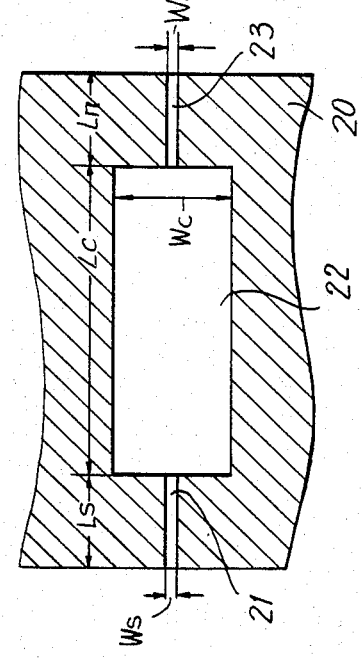

FIGS. 2A, 2B and 2C depict several relevant parameters of dimensions for an on-demand type ink jet used in the present invention which will be utilized in the discussion which follows. Depicted is a substrate 20 which supports an ink supply passage 21, an ink pressurization chamber 22, and a nozzle 23. Ink pressurization chamber 22 has a wall 22a which includes a double-layer panel 19 having a vibratory plate 24 and a transducer or piezoelectric element 25 positioned on and bonded to vibratory plate 24. When an electric pulse from a voltage source 15 is applied to piezoelectric element 25, the double-layer panel is warped to vary the volume of ink pressurization chamber 22, developing a pressure in the ink for ejecting ink particles or droplets out through nozzle 23. The dimension parameters of the on-demand type ink jet are indicated as shown. In FIGS. 2A, 2B and 2C, the various symbols are defined as follows:
L: length,
W: width,
D: depth,
T: thickness,
S: cross-sectional area, and
U: distance around cross-sectional shape.
Suffixes attached to these symbols are indicative of:
s: ink supply passage,
c: ink pressurization chamber,
n: nozzle,
v: vibratory plate, and
p: piezoelectric element.

The length Lv of vibratory plate 24 and the length Lp of piezoelectric element 25 are represented by the length Lc of ink pressurization chamber 22. The width Wv of vibratory plate 24 and the width Wp of piezoelectric element 25 are represented by the width Wc of the ink pressurization chamber.

Figure 3:
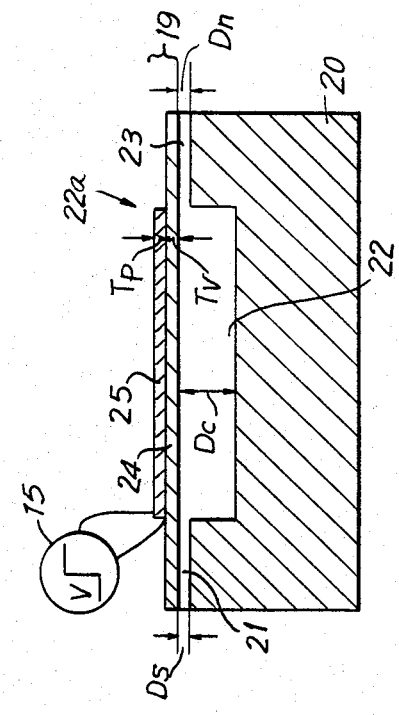
FIG. 3 is an equivalent circuit diagram of the on-demand type ink jet recording head of the present invention.

The on-demand type ink jet mechanism illustrated in FIGS. 2A, 2B and 2C can be expressed by an equivalent model shown in FIG. 3 as a result of suitable approximation and omission under the condition of $Lc > Wc$. In FIG. 3, the several reference designations are defined as follows:

$C_0$: compliance based on elastic deformation of the double-layer panel of vibratory plate 24 and piezoelectric element 25, $$C_0 = \alpha \frac{Wc^5 Lc}{EI} \tag{1}$$

where EI: flexural rigidity of double-layer panel 19 per unit length, $$EI = \frac{Ep Tp^3}{12} f(m, n),$$

$$f(m, n) = \frac{m^3 n^5 + 5m^2 n^4 + 4mn^3 + 6m^2 n^3 + 6mn^2 + 4m^2 n^2 + 5mn + 1}{mn^3(mn + 1)^2},$$

where
$m = Ep/Ev$ ratio between Young's moduli of piezoelectric element 25 and vibratory plate 24,
$n = Tp/Tv$ ratio between thicknesses of piezoelectric element 25 and vibratory plate 24,
Ep: Young's modulus of piezoelectric element 25,
Ev: Young's modulus of vibratory plate 24,
$\alpha$: parameter indicative of the condition in which vibratory plate 24 and head substrate 20 are fixed:
$1/720$ (peripheral fixing) $\leq \alpha \leq 1/120$ (peripheral support).
In the following description, $\alpha$ is selected to be 1/120.

$C_1$: compliance based on the elasticity of volume of the ink in ink pressurization chamber 22.

$$C_1 = ScLc/a^2\rho \tag{2}$$

where
a: speed of sound travelling through ink,
$\rho$: ink density.
Ms, Mn: inertance of ink supply passage 21 and nozzle 23, respectively.

$$Ms = \rho Ls/Ss \tag{3}$$

$$Mn = \rho Ln/Sn \tag{4}$$

Rs, Rn: resistance of ink supply passage 21 and nozzle 23, respectively.

$$Rs = 2\eta Ls Us^2/Ss^3 \tag{5}$$

$$Rn = 2\eta Ln Un^2/Sn^3 \tag{6}$$

where $\eta$: ink viscosity.
Mcs, Mcn: inertance of ink pressurization chamber 22 equivalenty distributed and added to the ink supply passage 21 and nozzle 23

$$Mcs = \beta s Mc \tag{7}$$

$$Mcn = \beta n Mc \tag{8}$$

where Mc: inertance of ink pressurization chamber 22

$$Mc = \gamma M(\rho Lc/Sc),$$

where $\gamma M$: correction parameter resulting from the distribution of ink flows in ink pressurization chamber 22, $0 \leq \gamma M \leq 1$.

In the following, $\gamma M = \frac{1}{3}$.

$\beta s$, $\beta n$: parameter for distributing the inertance Mc and resistance Rc of ink pressurization chamber 22 to ink supply passage 21 and nozzle 23, respectively. Where $$\beta s, \beta n > 0,$$

$$\beta s + \beta n = 1,$$

if $$Ms = Mn,$$

$$Rs = Rn,$$

then $$\beta s = \beta n = \tfrac{1}{2}$$

Rcs, Rcn: resistance of ink pressurization chamber 22 equivalently distributed and added to ink supply passage 21 and nozzle 23

$$Rcs = \beta s Rc \qquad (9)$$

$$Rcn = \beta n Rc \qquad (10)$$

where Rc: resistance of ink pressurization chamber 22

$$Rc = \gamma R \frac{2\eta Lc Uc^2}{Sc^3},$$

where $\gamma R$: correction parameter resulting from the distribution of ink flows in ink pressurization chamber 22, $$0 \leq \gamma R \leq 1$$

In the following, $\gamma R = \frac{1}{2}$.

$\phi$: pressure imposed equivalenty on piezoelectric element 25

$$\phi = \epsilon Vs/C_0, \qquad (11)$$

where

Vs: voltage applied, $\epsilon$: change in static volume of ink pressurization chamber 22 per unit voltage applied. This can be determined by employing the equation for computing the bending of a bimetal.

$$\epsilon = \frac{Wc^3 Lc d_{31}}{tp^2} g(m, n) \qquad (12)$$

where $d_{31}$: piezoelectric constant of piezoelectric element 25, $$g(m, n) = \frac{mn^2(n + 1)}{2(m^2n^4 + 4mn^3 + 6mn^2 + 4mn + 1)}.$$

$U_1$, $U_3$: volume velocity of ink flowing through ink supply passage 21 and nozzle 23.

The drive voltage having a stepped waveform required for ejecting ink droplets and the diameter of an ink droplet produced by the drive voltage can be expressed below through computations based on the model shown in FIG. 3.

$$Vs = \frac{1}{\frac{Wc^3 Lc d_{31}}{g(m, n)} \frac{Tp^2}{v \cdot Sn} \sqrt{\left(1 + \frac{1}{k}\right) M_3 C}} \exp\left(\frac{\delta}{\tan\delta}\right) \qquad (13)$$

$$D_{ink} s = \sqrt{\frac{M_3 C}{1 + \frac{1}{k}}} \cdot v \cdot Sn \left[\exp\left(\frac{\delta}{\tan\delta}\right)\right] \left[1 + \exp\left(-\frac{\pi}{\tan\delta}\right)\right] \qquad (14)$$

where
$C = C_0 + C_1,$
$M_3 = Mn + Mcn,$
$R_3 = Rn + Rcn,$
$k = \beta n/\beta s$
$\delta = \arctan(E/D)$
$D = R_3/2M_3$ $$E = \sqrt{\frac{1 + \frac{1}{k}}{M_3 C} - D^2}$$

v: desired speed of travel of ink droplets, and

Vs: drive voltage required for gaining the desired speed of travel of ink droplets.

Figure 4:
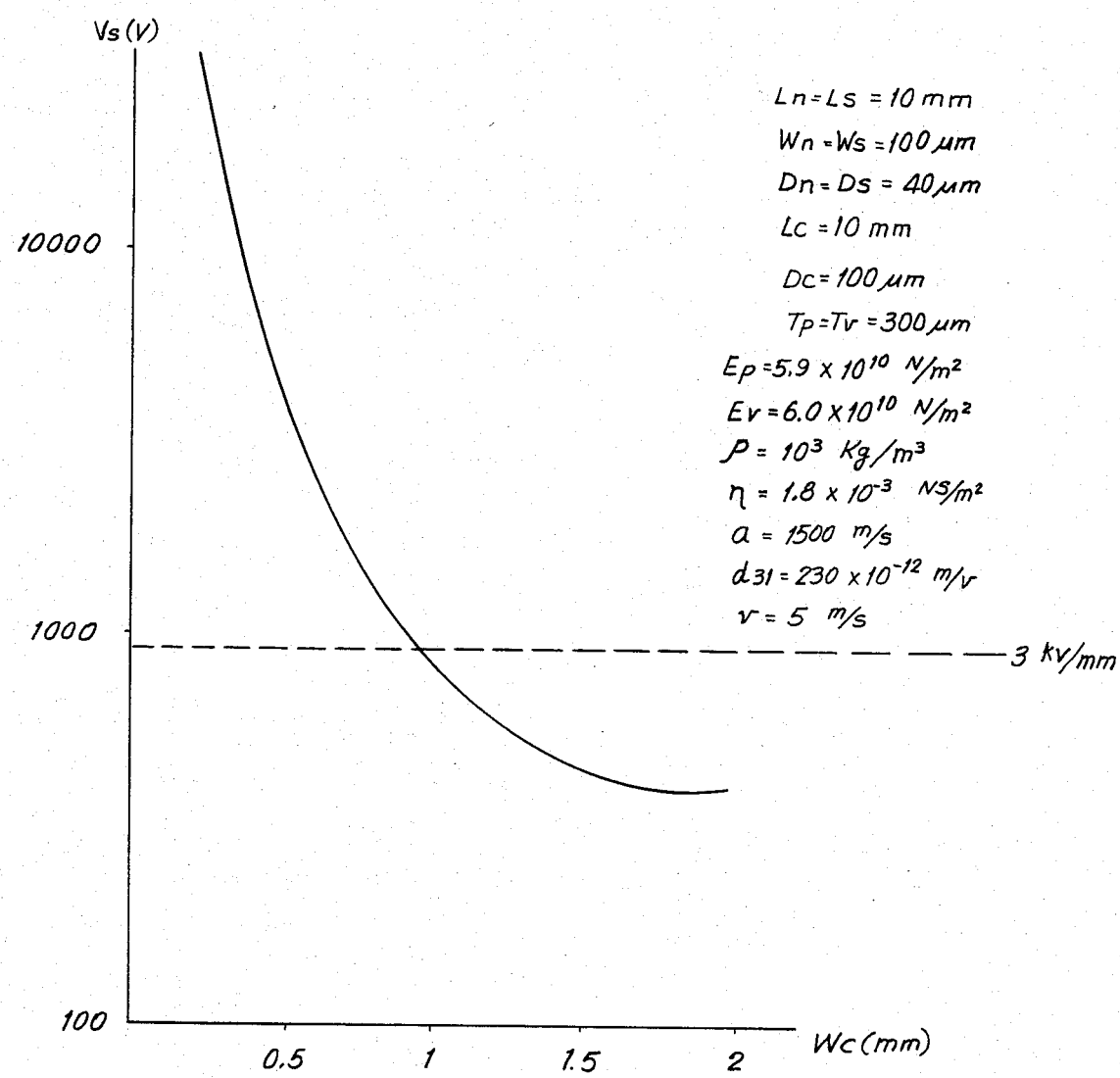
FIG. 4 is a graph depicting the relationship between the parameters Wc and V.

FIG. 4 is a graph depicting the drive voltages Vs as calculated by equation (13) which are necessary when the width Wc of ink pressurization chamber 22 is reduced. The calculations are based on the conditions: $Ln = Ls = 10$ mm, $Wn = Ws = 100$ μm, $Dn = Ds = 40$ μm, $Lc = 10$ mm, $Dc = 100$ μm, $Tp = Tv = 300$ μm, $\rho = 10^3$ Kg/m$_3$, $\eta = 1.8 \times 10^{-3}$ Ns/m$_2$, $a = 150$ m/s, and $v = 5$ m/s. The vibratory plate 24 was made of glass with $Ev = 6.0 \times 10^{10}$ N/m$^2$, and the piezoelectric element was made of PZT with $E\rho = 5.9 \times 10^{10}$ N/m$^2$, $d_{31} = 230 \times 10^{-12}$ m/V.

It will be seen from FIG. 4 that the drive voltage is increased sharply when the width Wc of the ink pressurization chamber is reduced. This is because equation (13) can be expressed by $Vs\alpha(1/Wc^3)$ in the region in which the width Wc is small. The electric field imposed on the piezoelectric element is given by Vs/Tp, and the allowable electric field for the piezoelectric element is shown by the broken line in FIG. 4. A study of FIG. 4 indicates, by way of theoretical calculations, that where the width Wc of the ink pressurization chamber is 1 mm or smaller, the piezoelectric element of prior art ink jet heads is subjected to an electric field exceeding the allowable electric field and, hence, undergoes dielectric breakdown.

By optimizing the parameters based on the above theoretical calculations, an ink jet recording head where the width Wc of the ink pressurization chamber is 1 mm or less can be realized which has conventionally been deemed impossible to construct.

As a result of the calculations, the parameters most effective when optimized are found to be the thickness Tp of piezoelectric element 25, the thickness Tv of vibratory plate 24, and the inertance Mn and resistance Rn of the nozzle 23.

The thicknesses Tp, Tv are effective parameters for the following reason: When $C_0$, $C_1$ are calculated from equations (1) and (2) above with Wc=1 mm, the results are $C_0 = 7.78 \times 10^{-20}$ m$^5$/N, and $C_1 = 4.25 \times 10^{-19}$ m$^5$/N. Since $C_0 << C_1$, equation (13) above can be rewritten as:

$$V_s \propto \frac{Tp^2}{g(m, n)} \quad (15)$$

The relationship $C_0 << C_1$ results from the fact that $C_0$ and $C_1$ are proportional respectively to the fifth power of Wc and the first power of Wc.

Figure 5:
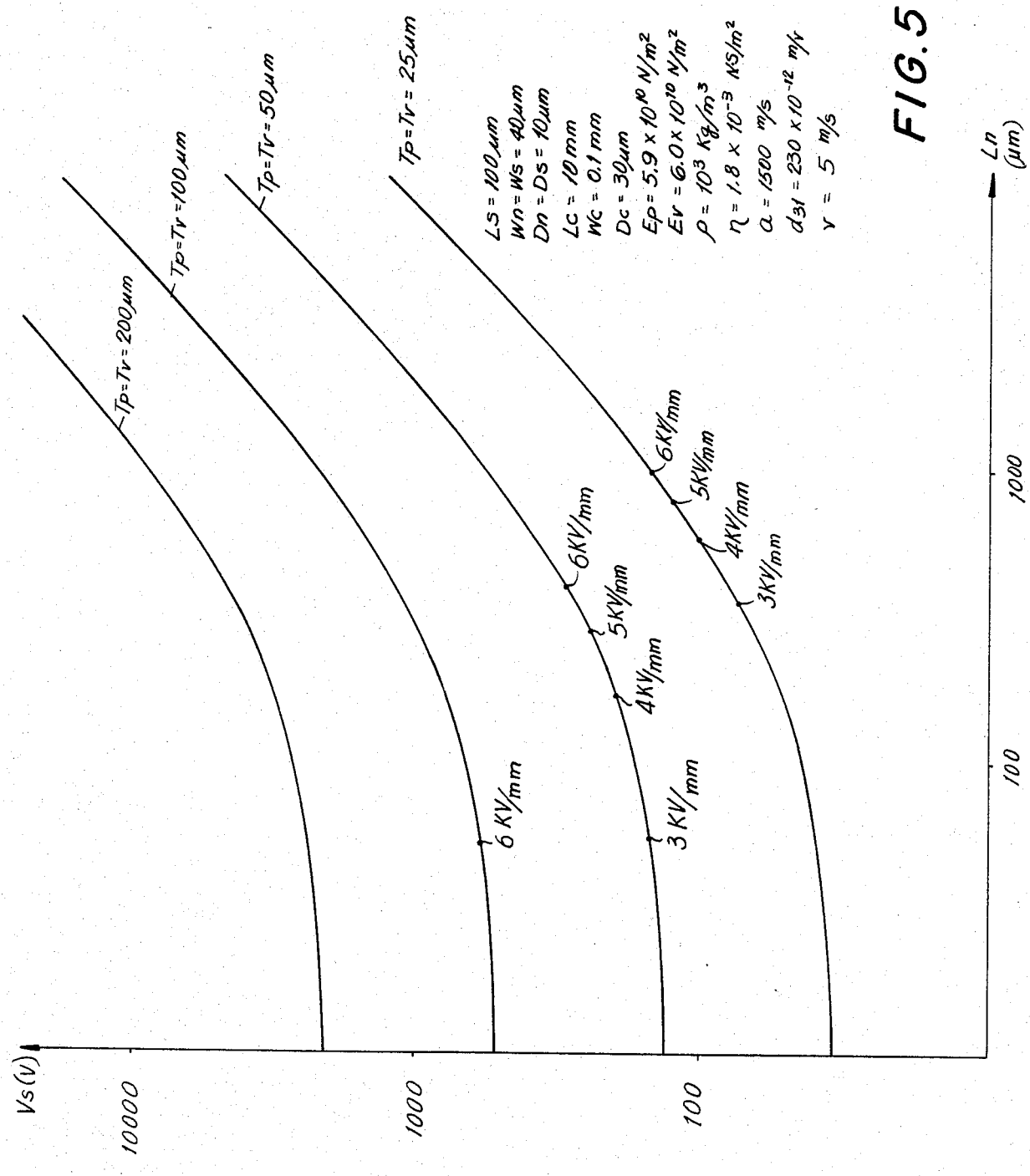
FIGS. 5 and 11 are graphs depicting the relationship between the parameters Tp, Tv, Ln and V.

FIG. 5 is a graph illustrating drive voltages as calculated from equation (13) above which are required when the thickness Tp of piezoelectric element 25, the thickness Tv of vibratory plate 24, and the length Ln of the nozzle 23 are changed. The other dimensional parameters are selected as follows: Ls=100 μm, Wn=Ws=40 μm, Dn=Ds=10 μm, Lc=10 mm, Wc=0.1 mm, and Dc=30 μm.

FIG. 5 shows that by suitably selecting the parameters Tp, Tv, Ln, an on-demand type ink jet where the width Wc of the ink pressurization chamber is 0.1 mm can be realized which has heretofore been impossible to fabricate. More specifically, an ink jet head with Wc=0.1 mm can be realized by selecting Ln≦55 μm for Tp=Tv=50 μm or Ln≦350 μm for Tp=Tv=25 μm where the allowable electric field for the piezoelectric element is 3 KV/mm, and Ln≦52 μm for Tp=Tv=100 μm, Ln≦400 μm for Tp=Tv=50 μm, or Ln≦1 mm for Tp=Tv=25 μm where the allowable electric field for the piezoelectric element is 6 KV/mm. The values 3 KV/mm and 6 KV/mm are indicative of dielectric strengths for PZT fabricated by a normal process and PZT fabricated by an HIP (hot isostatic press) process.

It can be understood from FIG. 5 that the smaller the nozzle length Ln, the lower the drive voltage Vs may be. From the standpoints of fabrication and stability in ink ejection, however, the nozzle length Ln should preferably be 10 μm or greater. Since no ink ejection is possible with the nozzle length Ln of 1 mm or larger, it is preferable that the nozzle length Ln be determined within the range of 10 μm≦Ln≦1 mm for the width Wc of 0.1 mm. For the width Wc of 1 mm, however, the nozzle length Ln may be of a greater dimension.

Since the nozzle length Ln is a parameter related only to the inertance Mn and resistance Rn of the nozzle as indicated by equations (4) and (6) above, the relationship between Ln and Vs represents the relationship between Mn, Rn and Vs. Thus, Vs can be made smaller when Mn and Rn are reduced. The parameters Mn, Rn can be reduced by varying the cross-sectional shape of the nozzle from the outlet of the ink pressurization chamber to the nozzle end face. In this case, the discussion made with reference to FIG. 5 is also applicable to equivalent nozzle lengths LnM and LnR which are introduced according to the following equations.

The equivalent nozzle length LnM for Mn is given by:

$$LnM = Sn(Ln) \int_0^{Ln} \frac{1}{Sn(L)} dL \quad (16)$$

The equivalent nozzle length LnR for Rn is given by:

$$LnR = \frac{Sn(Ln)^3}{Un(Ln)^2} \int_0^{Ln} \frac{Un(L)^2}{Sn(L)^3} dL \quad (17)$$

where

L: coordinate along the stream line of the nozzle from the outlet (L=0) of the ink pressurization chamber to the nozzle end face (L=Ln), Sn(L): nozzle cross-sectional shape at coordinate L, and Un(L): distance around the nozzle cross section at coordinate L.

Figure 6:
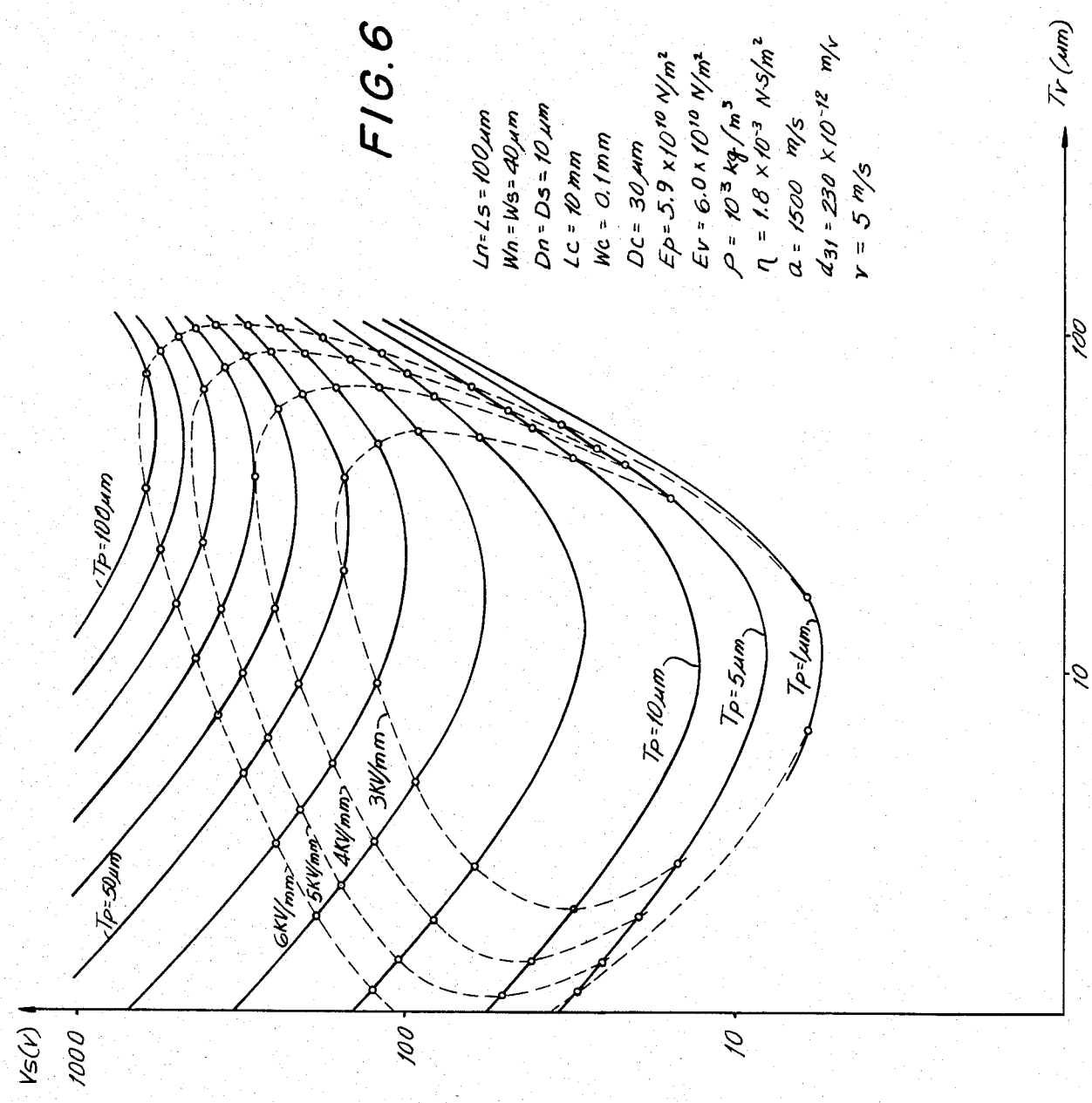
FIGS. 6 through 10 are graphs depicting the relationship between the parameters Tp, Tv and V.

FIG. 6 is a graph indicative of drive voltages V as calculated using equation (13) above which are necessary when the parameters Tp, Tv are varied with Ln of 100 μm unchanged with a view to obtaining an optimum combination of Tp and Tv.

A study of FIG. 6 shows that the drive voltage V can be held at a minimum by selecting Tv=50 μm when Tp=100 μm, Tv=40 μm when Tp=80 μm, and Tv=30 μm when Tp=60 μm, for example.

As described above, the drive voltage is limited because of the strength of the piezoelectric element against dielectric breakdown. This can be indicated by modifying equation (13) above as follows: An equation expressing the electric field applied to the piezoelectric element:

$$\frac{V_s}{Tp} = \quad (18)$$

$$\frac{1}{Wc^3 L c d_{31}} \frac{Tp}{g(m, n)} \cdot v \cdot Sn \sqrt{\left(1 + \frac{1}{k}\right)} M_3 C \exp\left(\frac{\delta}{\tan\delta}\right)$$

can be expressed, when kept below a certain value, by:

$$\frac{1}{Wc^3 L c d_{31}} \frac{Tp}{g(m, n)} \cdot \quad (19)$$

$$v \cdot Sn \sqrt{\left(1 + \frac{1}{k}\right)} M_3 C \exp\left(\frac{\delta}{\tan\delta}\right) \leq E_{permit}$$

where Epermit is the allowable electric field for the piezoelectric element.

FIG. 6 shows equipotential lines indicated by broken lines where constant electric fields are applied to the piezoelectric element. It will be seen from FIG. 6 that the combinations of Tp, Tv which satisfy equation (19) are given in the form of regions. Where ordinary Epermit for PZT is 3 KV/mm, the combination corresponds to the region surrounded by the innermost broken line. The electric field applied to the piezoelectric element can be held within an allowable range by selecting Tv in the range of 20 μm≦Tv≦36 μm for Tp=50 μm, and in the range of 9 μm≦Tv≦47 μm for Tp=40 μm.

Where PZT fabricated by the HIP process is employed, Epermit goes up to 6 KV/mm or higher as described before. The combination of Tp, Tv permitted for such an electric field may be in the range surrounded by the outermost broken line. As an example, Tv may be selected in the range of 35 μm≦Tv≦74 μm for Tp=100 μm or in the range of 5 μm≦Tv≦100 μm for Tp=50 μm. By using PZT fabricated by the HIP process instead of ordinary PZT, a piezoelectric element and a vibratory plate which are of greater thickness can be employed which allows them to be fabricated easily and handled more readily.

For Epermit=5 KV/mm selected to provide a design margin, Tv may be in the range of 23 $\mu m \leq Tv \leq 68$ $\mu m$ for Tp=80 $\mu m$ or in the range of 6.4 $\mu m \leq Tv \leq 88$ $\mu m$ for Tp=50 $\mu m$, for example. The ink jet constructed with the parameters Tp, Tv selected in these combinations operates normally when the dielectric strength is lowered due to humidity and temperature variations and other time-dependent changes, and hence has an increased degree of reliability in operation.

Figure 7:
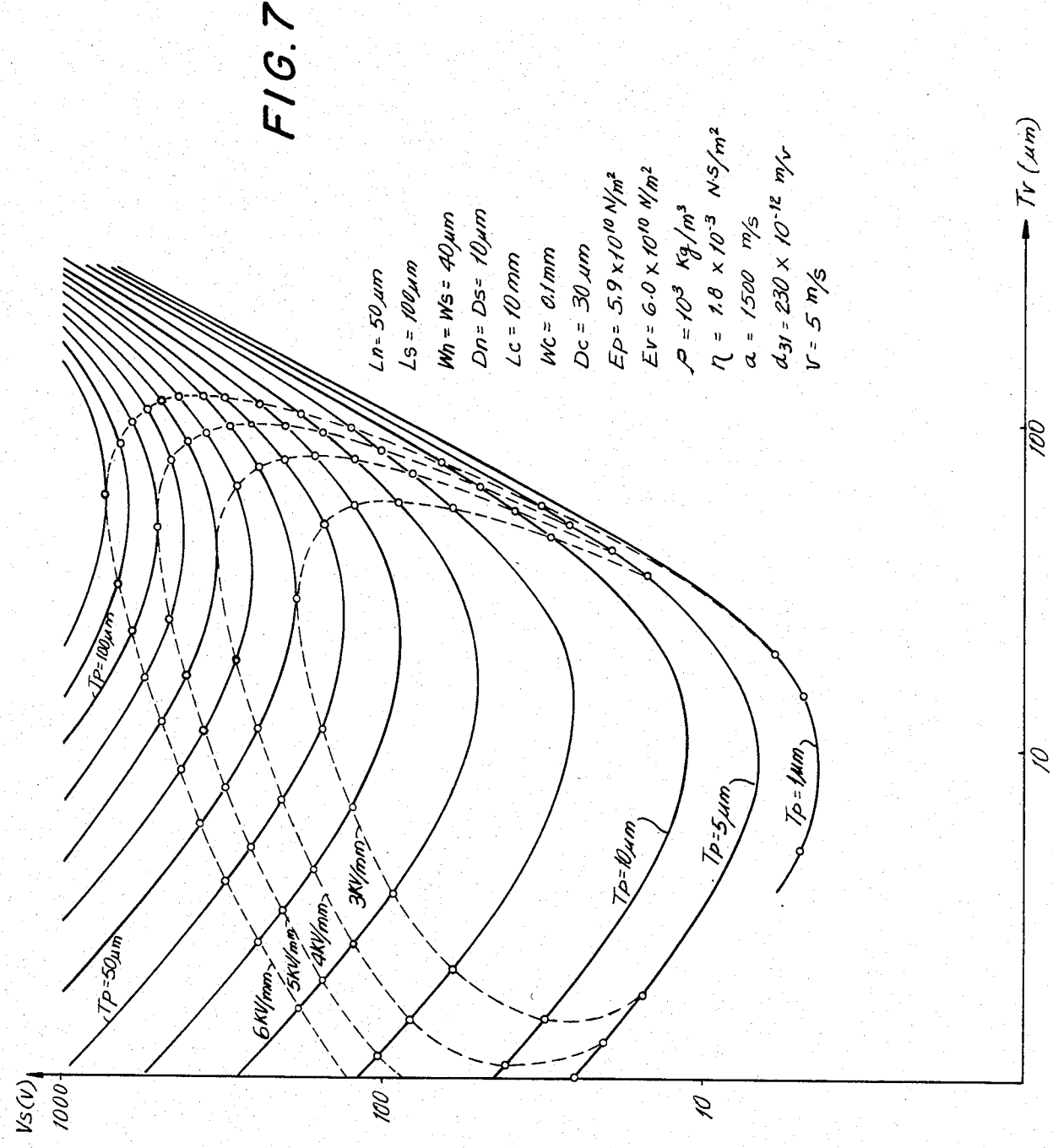

FIG. 7 is a graph depicting drive voltages as calculated by equation (13) above which are required when nozzle length Ln is varied from 100 $\mu m$ to 50 $\mu m$ with the other dimensions left unchanged. Comparison between FIGS. 6 and 7 shows that the drive voltage is lowered by reducing the nozzle length Ln and cutting down on the inertance Mn and resistance Rn of the nozzle. The reduction in the required drive voltage results in a wider range of combinations of Tp, Tv. As a consequence, when PZT made by the HIP process is used, Tv can be selected in the range of 23 $\mu m \leq Tv \leq 100$ $\mu m$ for Tp=$\phi\mu m$ or in the range of 4 $\mu m \leq Tv \leq 120$ $\mu m$ for Tp=50 $\mu m$, for example.

Figure 8:
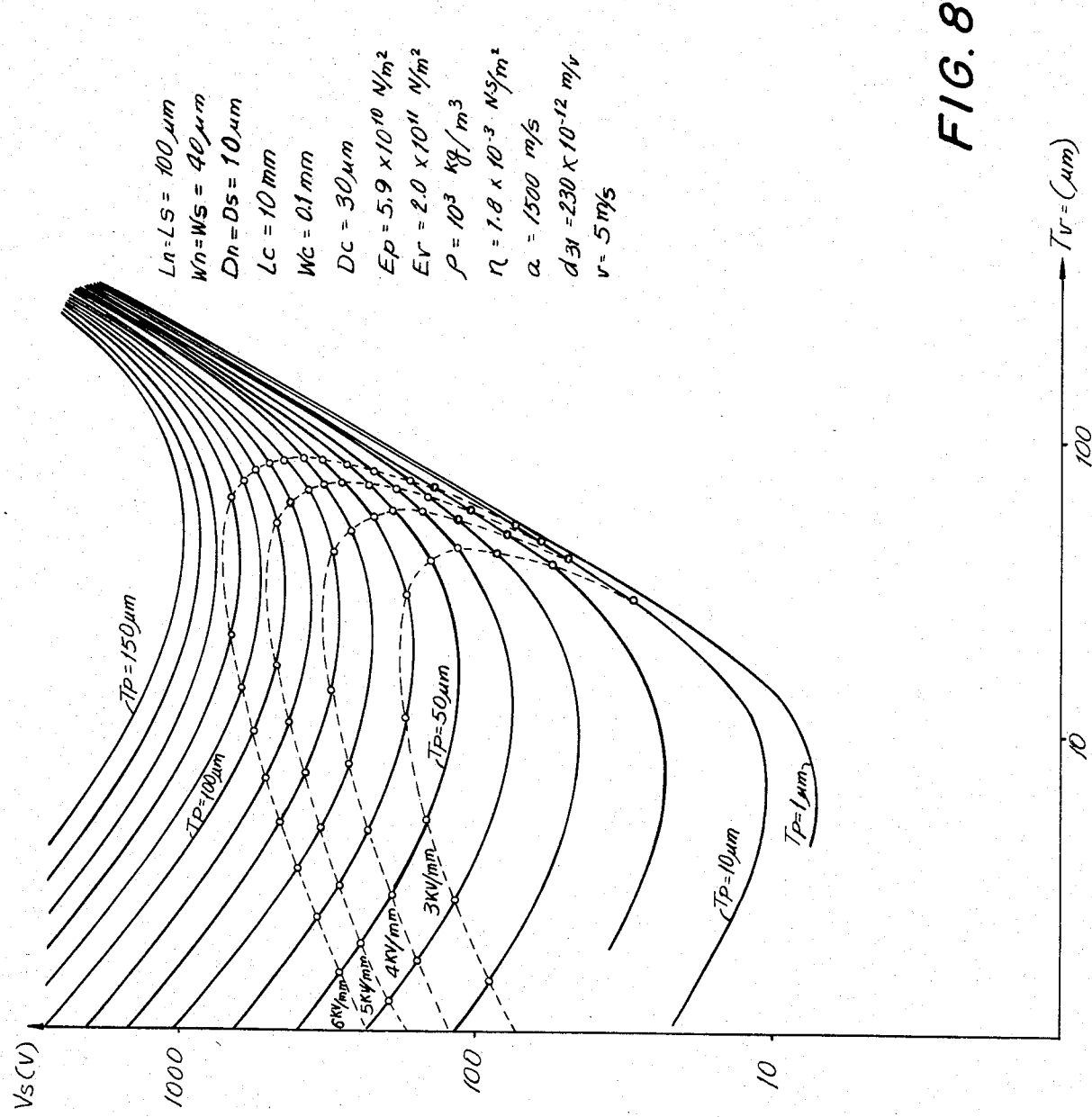

FIG. 8 is a graph illustrating drive voltages as calculated by equation (13) above which are necessary when the vibratory plate is made of sheet metal such as SUS. The parameters relating to the dimensions of the ink jet are selected to be equal to those used for the calculations in FIG. 6, and the Young's modulus of the vibratory plate is Ev=$2.0 \times 10^{11}$ N/m². Comparison between FIGS. 8 and 6 indicates that for Tp=100 $\mu m$, the minimum drive voltage for a vibratory plate of glass is 580 V for Tv=50 $\mu m$, whereas the minimum drive voltage for a metallic vibratory plate is 480 V for Tv=30 $\mu m$. Therefore, by employing a metallic vibratory plate having a greater Young's modulus instead of a vibratory plate of glass, the drive voltage may be smaller when the thickness of the vibratory plate is optimized for the piezoelectric element of the same thickness.

The vibratory plate may be composed of a piezoelectric element, and a drive voltage may be applied to the double-layer piezoelectric elements in a direction such that one of the piezoelectric elements will be elongated and the other will contract. This means that g(m, n) in equation (12) above is increased, and the drive voltage can be reduced as can be seen from equation (13) above.

The ink ejection method as described above is such that the volume of the ink pressurization chamber is reduced by application of a voltage for ejecting ink droplets out through the nozzle. According to another known ink ejection method, a voltage is first applied in a direction to increase the volume of the ink pressurization chamber to withdraw ink back into the nozzle, and then a voltage is applied in a direction to reduce the volume of the ink pressurization chamber in synchronism with returning movement of the ink due to the natural frequency of the ink jet system, thereby expelling ink droplets out of the nozzle. The former ink ejection method will hereinafter be referred to as a "push-on ejection method" while the latter method will be referred as a "draw-push ejection method".

The drive voltage $V_B$ required by the draw-push ejection method and the diameter $D_{ink\,B}$ of an ink droplet produced thereby are determined by calculations based on the model of FIG. 3 as follows:

$$V_B = \frac{1}{Wc^3 L c d_{31}} \frac{Tp^2}{g(m,n)} \cdot v \cdot Sn \sqrt{\left(1+\frac{1}{k}\right) M_3 C \left[\exp\left(\frac{\delta}{\tan\delta}\right)\right]} \left[\frac{1}{1+\exp\left(-\frac{\pi}{\tan\delta}\right)}\right] \quad (20)$$

$$D_{ink\,B} = \sqrt{\frac{M_3 C}{1+\frac{1}{k}} \cdot v \cdot Sn \left[\exp\left(\frac{\delta}{\tan\delta}\right)\right]} \left[\exp\left(-\frac{\pi}{\tan\delta}\right)\right] \quad (21)$$

Equation (20) can be rewritten into a conditional expression including an allowable electric field Epermit for the piezoelectric element as follows:

$$\frac{1}{Wc^3 L c d_{31}} \frac{Tp}{g(m,n)} \cdot v \cdot Sn \sqrt{\left(1+\frac{1}{k}\right) M_3 C \left[\exp\left(\frac{\delta}{\tan\delta}\right)\right]} \left[\frac{1}{1+\exp\left(-\frac{\pi}{\tan\delta}\right)}\right] \leq Epermit \quad (22)$$

It will be understood from comparison between equation (20) for the draw-push ejection method and equation (13) for the push-on ejection method that the drive voltage required by the draw-push ejection may be $$\frac{1}{1+\exp\left(-\frac{\pi}{\tan\delta}\right)}$$

of that required by the push-on ejection for producing ink droplets travelling at the same speed. Therefore, the drive voltage may be smaller when the draw-push ejection method is relied on. The draw-push ejection method is further advantageous in that the conditions the parameters must meet are given by expression (22), which is wider than expression (19), and hence the parameters such as the thickness Tp, Tv of the piezoelectric element and the vibratory plate can be selected in wider ranges.

Figure 9:
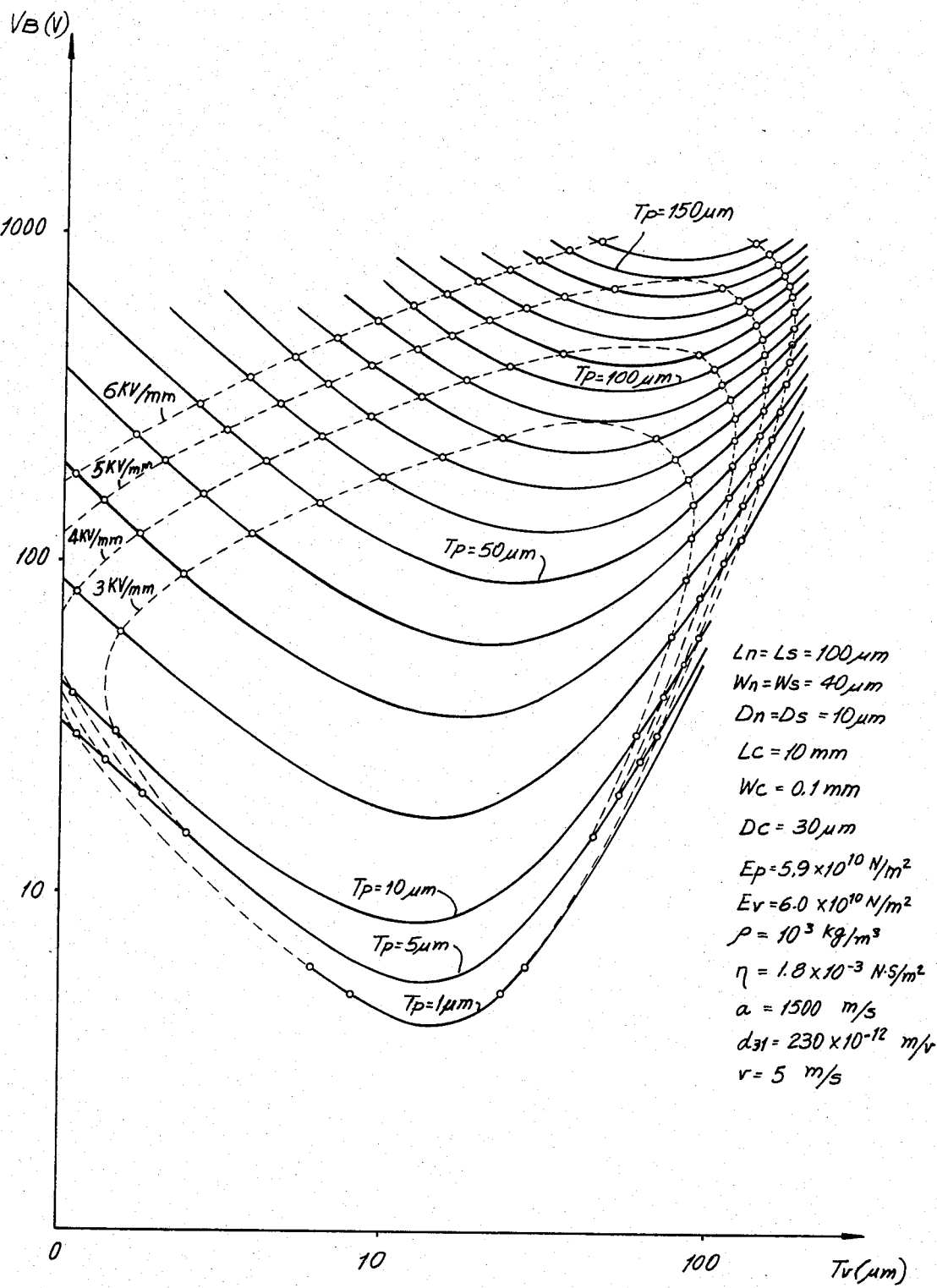

FIG. 9 is a graph depicting ranges of Tp, Tv which are calculated using equation (20) when the draw-push ejection method is employed with the parameters selected to be equal to those determined for the calculations of FIG. 6. As shown in FIG. 9, where ordinary PZT having Epermit of 3 KV/mm is used, an ink jet with Wc=0.1 mm can be realized by selecting Tv in the range of 6 $\mu m \leq Tv \leq 87$ $\mu m$ for Tp=50 $\mu m$ or in the range of 4 $\mu m \leqq Tv \leqq 85$ $\mu m$ for $Tp=40$ $\mu m$, for instance. Where PZT fabricated by the HIP process and having Epermit of 6 KV/mm is employed, an ink jet with $Wc=0.1$ mm can be realized by selecting Tv in the range of 12 $\mu m \leqq Tv \leqq 180$ $\mu m$ for $Tp=100$ $\mu m$, or in the range of 2.5 $\mu m \leqq Tv \leqq 160$ $\mu m$ for $Tp=50$ $\mu m$, for example. Comparison between FIGS. 6 and 9 indicates that where the draw-push ejection method is employed, the range of combinations of Tp, Tv becomes wider allowing a thicker piezoelectric element and a thicker vibratory plate to be used, and ink jet head can be fabricated more easily and handles more readily.

Figure 10:
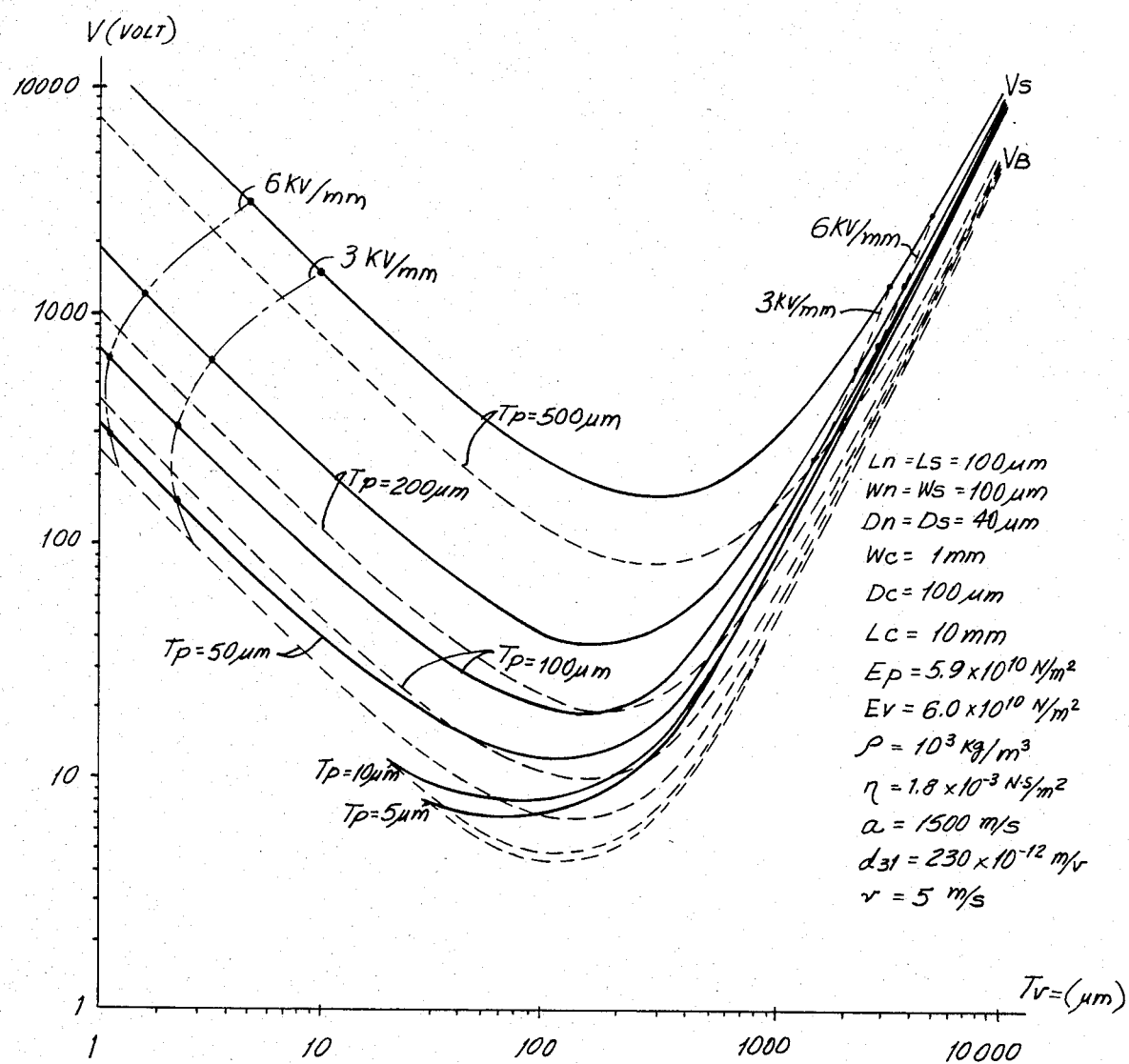

FIG. 10 is a graph illustrating the correlation between the thickness Tv of the vibratory plate, the drive voltage V, and the thickness Tp of the piezoelectric element with the width Wc of the pressurization chamber being 1 mm, the length Lc of the pressurization chamber being 10 mm, and the nozzle length Ln being 100 $\mu m$. The curves indicated by the solid lines are obtained by the push-on ejection method, while the curves indicated by the broken lines are obtained by the draw-push ejection method. It will be understood also from FIG. 10 that the drive voltage is lower for the draw-push ejection method than the push-on ejection method.

Figure 11:
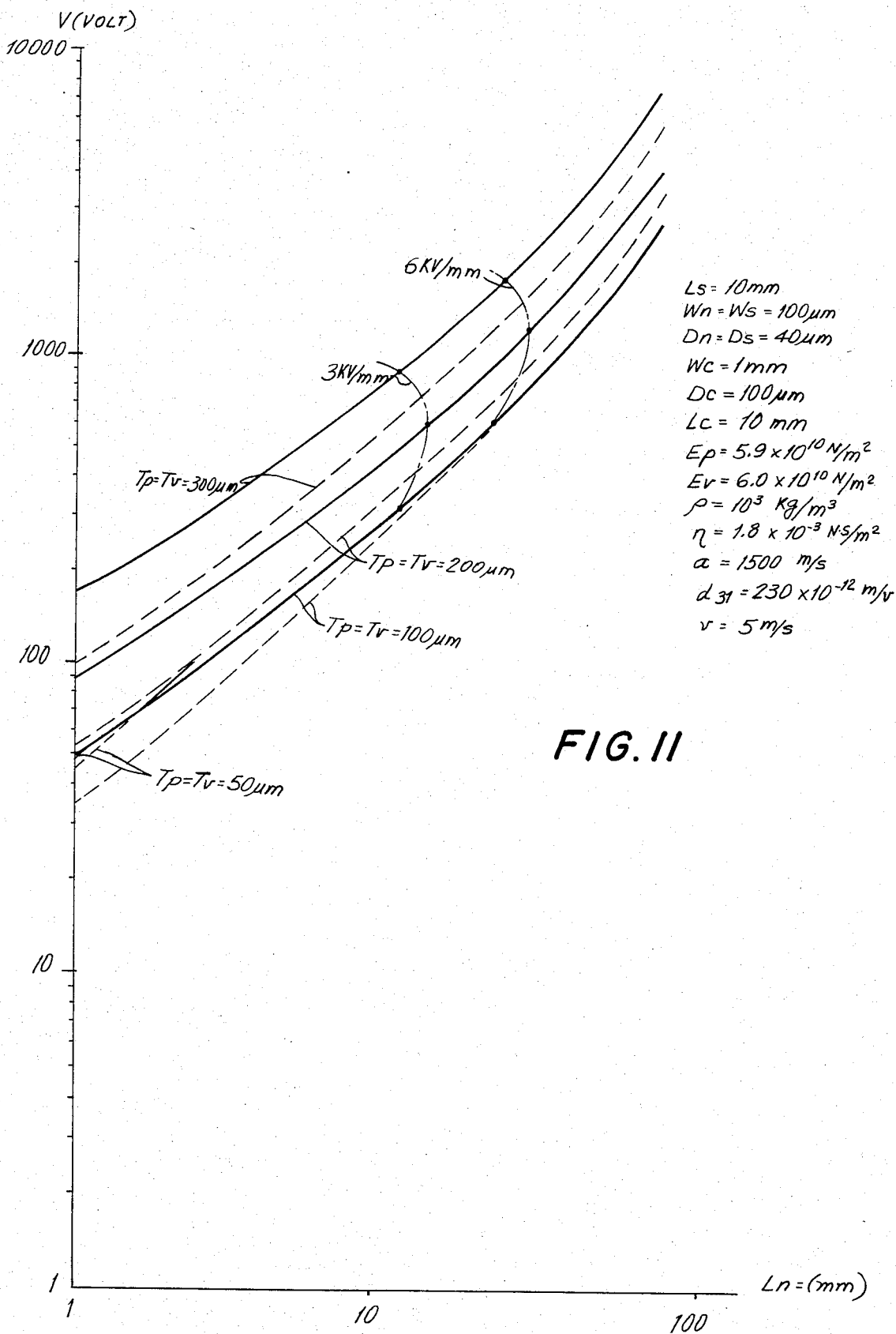

FIG. 11 is a graph showing the correlations between the nozzle length Ln, the drive voltage V, and the thickness Tv, Tp of the vibratory plate and the piezoelectric element with the width Wc of the ink pressurization chamber being 1 mm and the length Lc thereof being 10 mm. As in FIG. 10, the curves indicated by the solid lines are obtained by the push-on ejection method, while the curves indicated by the broken lines are obtained by the draw-push ejection method. It can be seen from FIG. 11 that when the width Wc of the ink pressurization chamber is selected to be 1 mm, the nozzle length Ln is increased to 1 mm or more, but the drive voltage V rises.

Briefly summarized, the parameters serving as the key for fabricating an on-demand ink jet with Wc of 1 mm or smaller are the thickness Tp of the piezoelectric element, the thickness Tv of the vibratory plate, and Mn, Rn (that is, the nozzle length Ln). On-demand type ink jets having desired widths Wc of the ink pressurization chamber can be realized by making the nozzle length Ln as short as possible in a range permitted by the fabrication and the stability on ink droplet ejection, then determining the other parameters than Tp, Tv, Ln, and finally determining the combination of Tp, Tv in a range that meets expression (19) for the push-on ejection method and expression (22) for the draw-push ejection method.

FIGS. 12A and 12B show an on-demand type ink jet recording head generally indicated at 100 having multiple nozzles according to an embodiment of the present invention. Recording head 100 comprises a plurality of ink jet elements 50 each including an ink supply passage 31, a pressurization chamber 32, a vibratory plate 34, piezoelectric element 35 and a nozzle 33. The recording head of FIGS. 12A and 12B has ink jet elements 50 disposed in staggered relation on both sides 36a and 36b of a head substrate 36 for a much higher recording density. As an example, the recording head can be designed with $Wc=0.55$ mm, $Ln=250$ $\mu m$, $Ls=350$ $\mu m$, $Wn=Ws=100$ $\mu m$, $Dn=Ds=40$ $\mu m$, $Lc=10$ mm, $Dc=100$ $\mu m$, a vibratory plate 34 made of glass with $Tv=100$ $\mu m$, and a piezoelectric element 35 made of PZT fabricated by the HIP process with $Tp=100$ $\mu m$.

The drive voltage required by such recording head and the diameter of an ink droplet produced thereby are 62 V and 59 $\mu m$, respectively, for the push-on ejection method, and 32 V and 54 $\mu m$, respectively, for the draw-push ejection method. When ink droplets were actually ejected using such a recording head design, their diameters were substantially as calculated, but the drive voltage required was 150 V for the push-on ejection method and the drive voltage required was 110 V for the draw-push ejection method, these voltages being greater than theoretical values.

The increased voltages result from the fact that the voltage is applied to piezoelectric elements through a charging resistor and a discharging resistor for stabilized ink ejection, so that the waveform of the actual drive voltage is more rounded than the stepped and rectangular waveforms used for the calculations, and that the calculations do not take into account the energy loss occasioned when a column of ink ejected out of the nozzle is broken up into ink droplets. In addition, when the thickness of the vibratory plate and the piezoelectric element are changed from 100 $\mu m$ and 200 $\mu m$ respectively, the drive voltage required and the diameter of an ink droplet are 200 V and 62 $\mu m$, respectively, for the push-on ejection method, and 110 V and 49 $\mu m$, respectively, for the draw-push ejection method. As mentioned above, the drive voltage is increased. On the other hand, it is easy to produce and operate such a recording head, and the yield rate is increased. By designing the distance between adjacent ink pressurization chambers to be 0.085 mm, the on-demand type ink jet recording head can provide a dot pitch of 1/80 inch.

With the on-demand type ink jet recording head thus constructed, the width Wc of the ink pressurization chamber can be 1 mm or less, and hence the dot pitch can be reduced to 1/60 inch or smaller. Since the inter-nozzle pitch is equal to the pitch between adjacet ink pressurization chambers, it is not necessary to bend the nozzles, and as a result all ink jets can have equal characteristics. Any increase in the nozzle length which would otherwise be caused by the bent nozzles can be eliminated, resulting in multiple nozzles fabricated at a higher design level.

Such on-demand ink jet recording heads capable of high-density recording and having nozzles designed on a fully multiple basis find applications in various information-related devices such as line printers, facsimile receivers, and copiers.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An on-demand type ink jet recording head comprising a substrate, a plurality of pressurization chambers of substantially rectangular configuration disposed in adjacent relationship on said substrate, each said pressurization chamber having an inlet and an outlet, each said pressurization chamber having an ink supply passage in fluid communication with the respective inlet thereof for supplying ink to said pressurization chambers, each said pressurization chamber having a nozzle with a first end in fluid communication with the respective outlet thereof and a second end through which ink droplets are ejected, said nozzles extending in a substantially straight line from said respective pressurization chamber associated therewith, each said pressurization chamber having a vibratory plate which forms at least a portion of a wall of said pressurization chambers, a piezoelectric element associated with each said pressurization chamber and coupled respectively to the vibratory plate thereof, said piezoelectric elements being responsive to an electric signal selectively applied thereto for flexing the vibratory plates associated therewith to change the volume of the pressurization chambers associated therewith, said nozzles each having an equivalent nozzle length Ln of 1 mm or less defined between the outlet of said pressurization chamber and the second end of said nozzle, each said pressurization chamber having a width Wc of 1 mm or less and a length Lc of 1 mm or more, said vibratory plate having a thickness Tv of 200 $\mu$m or less and said piezoelectric elements having a thickness Tp of 200 $\mu$m or less.

2. The ink jet recording head as claimed in claim 1, wherein said pressurization chambers are disposed in adjacent relationship along the length Lc thereof.

3. The ink jet recording head as claimed in claim 2, wherein said nozzles are spaced at an internozzle pitch of 1/60 inch or less.

4. The ink jet recording head as claimed in claim 1, wherein said vibratory plate is made from a glass material.

5. The ink jet recording head as claimed in claim 1, wherein said vibratory plate is made from a sheet metal material.

6. The ink jet recording head as claimed in claim 1, wherein said piezoelectric elements and vibratory plate cooperate when an electric signal is applied thereto to reduce the volume of said piezoelectric chambers.

7. The ink jet recording head as claimed in claim 1, wherein said piezoelectric elements and vibratory plate cooperate when a first electric signal is applied thereto to increase the volume of said pressurization chambers to draw ink into said pressurization chambers, the volume of said pressurization chambers being reduced when a second electric signal is applied to said piezoelectric elements to expel ink out of said nozzles.

8. The ink jet recording head as claimed in claim 1, wherein said substrate has first and second opposing surfaces, said pressurization chambers being alternately disposed on said first and second substrate surfaces.

* * * * *